United States Patent
Chen et al.

(10) Patent No.: US 11,178,528 B2
(45) Date of Patent: Nov. 16, 2021

(54) MEDIA CONTENT CONTROL OF SOURCE DEVICES ON SINK DEVICES

(71) Applicant: HEWLETT-PACKARD DEVELOPMENT COMPANY, L.P., Houston, TX (US)

(72) Inventors: Chung-Chun Chen, Taipei (TW); Yi-Kang Hsieh, Taipei (TW); Han-Kuang Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 219 days.

(21) Appl. No.: 16/076,100

(22) PCT Filed: Feb. 6, 2017

(86) PCT No.: PCT/US2017/016629
§ 371 (c)(1),
(2) Date: Aug. 7, 2018

(87) PCT Pub. No.: WO2018/144026
PCT Pub. Date: Aug. 9, 2018

(65) Prior Publication Data
US 2021/0219118 A1    Jul. 15, 2021

(51) Int. Cl.
*G06F 3/14* (2006.01)
*H04W 4/80* (2018.01)
*H04W 76/19* (2018.01)
*H04W 76/30* (2018.01)
*H04W 76/14* (2018.01)
(Continued)

(52) U.S. Cl.
CPC ............ *H04W 4/80* (2018.02); *G06F 3/1423* (2013.01); *H04W 76/14* (2018.02); *H04W 76/19* (2018.02); *H04W 76/30* (2018.02); *G06F 3/0488* (2013.01); *H04W 84/12* (2013.01)

(58) Field of Classification Search
CPC ................................ H04W 4/80; H04W 76/19
See application file for complete search history.

(56) References Cited

U.S. PATENT DOCUMENTS

2010/0262673 A1    10/2010    Chang et al.
2011/0151788 A1*    6/2011    Castrogiovanni ..... H04W 76/23
455/41.2
(Continued)

OTHER PUBLICATIONS

"The Last Windows Receiver You'll Ever Need", Reflector 2 | Mirroring and Streaming Receiver for Windows, Retrieved from Internet: http://www.airsquirrels.com/reflector/features/win/, Nov. 8, 2016, 12 pages.

*Primary Examiner* — Tuan H Nguyen
(74) *Attorney, Agent, or Firm* — HPI Patent Department (57) ABSTRACT

In one example, a sink device includes a display unit, a mirroring unit to mirror a first display screen of a first source device and a second display screen of a second source device at the display unit via a wireless network, a communication interface unit to receive a first input indicating a selection of the first display screen and interpret the first input as a control command to dynamically establish a peer-to-peer connection between the sink device and the first source device via a short-range wireless network, and a control unit to control media content associated with the first source device via the short-range wireless network based on a first human interface device (HID) command received at the sink device.

15 Claims, 8 Drawing Sheets

(51) Int. Cl.
  *G06F 3/0488* (2013.01)
  *H04W 84/12* (2009.01)

(56) References Cited

U.S. PATENT DOCUMENTS

| | | |
|---|---|---|
| 2013/0078904 A1 | 3/2013 | Yang |
| 2015/0163788 A1 | 6/2015 | Karunakaran |
| 2015/0350288 A1 | 12/2015 | Verma et al. |
| 2016/0124701 A1* | 5/2016 | Wang .................... G06F 3/1431 |
| | | 345/2.2 |
| 2017/0019473 A1* | 1/2017 | Venkataraman ........ H04L 41/22 |

* cited by examiner

MEDIA CONTENT CONTROL OF SOURCE DEVICES ON SINK DEVICES

BACKGROUND

Wireless display technology may be used in a variety of applications to support wirelessly transmitting media content or other application data. Wireless display technology, such as a Wi-Fi display, may enable sharing of media content or other application data between source devices and sink devices. For example, a source device may transmit the media content to a sink device. The sink device may receive and output the media content on a display unit of the sink device.

BRIEF DESCRIPTION OF THE DRAWINGS

Examples are described in the following detailed description and in reference to the drawings, in which.

DETAILED DESCRIPTION

Wireless display or Wi-Fi display systems may include multiple source devices and a sink device. A source device may be a device that can transmit media content to the sink device within a wireless network. Example source devices may include mobile phones, tablet computers, laptops, portable media players, digital image capturing devices, such as cameras or camcorders, and the like. The sink device may be a device that can receive and render the media content using the wireless network. Example sink device may include a Wi-Fi display device such as a television, personal computer (PC), monitor, projector, or any other wireless display device.

Upon establishing a connection session, the source devices may send media content to the sink device. For instance, the sink device may use a Wi-Fi connection to project a screen of the source device. Example media content may include, but not limited to, video, image, animation, text, audio (sound, music, and the like), interactive content, or a combination thereof. The sink device may playback/render the media content associated with the source devices. In one example, the media content may be communicated from the source devices to the sink device through a Wi-Fi connection.

Further, the sink device can transmit user inputs received at the sink device back to the source devices through a data communication. Thus, a user of the sink device can control the source devices and control the content that is being transmitted from the source devices to the sink device. For example, user inputs received at the sink device may be transmitted to a first source device through a Bluetooth HID connection. The Bluetooth HID connection can be established between one source device and one sink device at a time. When there are multiple source devices connected to the sink device and the user wants to control a second source device from the sink device, the user may have to first manually disconnect the Bluetooth HID connection with the first source device and then manually set the device information and/or credentials associated with the second source device to establish the Bluetooth HID connection with the second source device. Therefore, switching the Bluetooth HID connection between the sink device and the source devices each time can be tedious, time consuming, and may not be convenient for the user when there are multiple source devices connected to the sink device.

Examples described herein may use a sink device to control media content of source devices. The sink device may include a display unit, a mirroring unit, a communication interface unit, and a control unit. The mirroring unit may mirror, at the display unit via a wireless network, a first display screen of a first source device and a second display screen of a second source device. The communication interface unit may receive a first input indicating a selection of the first display screen.

Further, the communication interface unit n interpret the first input as a control command to dynamically establish a peer-to-peer (P2P) connection between the sink device and the first source device via a short-range wireless network. The control unit may control, via the short-range wireless network, media content associated with the first source device based on a first HID command received at the sink device.

Examples described herein may obviate the need for manual intervention in discovering source devices on the sink device, selecting source devices to connect to the sink device, and/or switching a P2P connection from one source device to another source device. Further, examples described herein may reduce the complexity and time-consumption of the connection/pairing procedures by dynamically establishing the P2P connection between the sink device and a respective source device.

Figure 1:
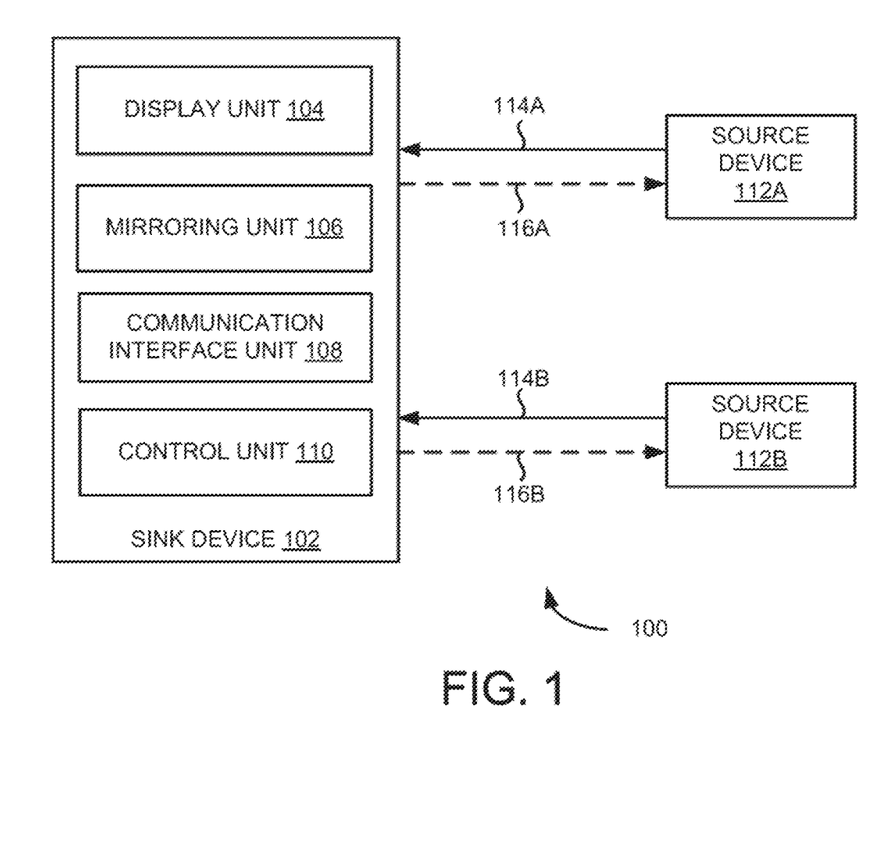
FIG. 1 is a block diagram illustrating an example sink device communicatively connected to source devices.

Turning now to figures, FIG. 1 is a block diagram 100 illustrating an example sink device 102 communicatively connected to source devices 112A and 112B. Source devices 112A and 112B may transmit media content to sink device 102 within a wireless network. Example source devices may include mobile phones, tablet computers, laptops, portable media players, digital image capturing devices, such as cameras or camcorders, and the like. Sink device 102 may receive and render the media content using the wireless network. Example sink device 102 may include a Wi-Fi display device such as a television, personal computer (PC), monitor, projector, or any other wireless display device. In FIG. 1, two source devices 112A and 112B are shown as being connected to sink device 102, however, any number of source devices can be connected to sink device. 102 via the wireless network.

Further, source devices 112A and 112B may transmit (e.g., share/stream) media content to sink device 102 through wireless connections 114A and 114B, respectively. For example, wireless connections 114A and 114B may be established over a Wi-Fi network. Furthermore, sink device 102 may transmit user inputs received at a user interface of sink device 102 to respective one of source devices (e.g., 112A or 112B) through a short-range wireless network. In one example, sink device 102 may be paired with source devices 112A and 112B via the shod-range wireless network, Example short-range wireless network may include a Bluetooth network, a Bluetooth low energy network, or a ZigBee network. In one example, sink device 102 and source devices 112A and 112B may be Bluetooth enabled HID devices. The term "short-range wireless network" and "short-range wireless communication" can be used interchangeably throughout the document.

As shown in FIG. 1, sink device 102 may include a display unit 104, a mirroring unit 106, a communication interface unit 108, and a control unit 110. During operation, mirroring unit 106 may mirror a first display screen of source device 112A and a second display screen of source device 112B on display unit 104 via the wireless network (e.g., wireless connections 114A and 114B, respectively). The term "mirror" may refer to sharing display screens of source devices 112A and 112B on sink device 102.

During operation, communication interface unit 108 may receive a first input indicating a selection of the first display screen. In one example, the first input indicating the selection of the first display screen may be received through display unit 104 of sink device 102. In another example, the first input indicating the selection of the first display screen may be received from source device 112A. Example first input may be a touch input, remote control input, and the like. Further, communication interface unit 108 may interpret the first input as a control command to dynamically establish a P2P connection 116A between sink device 102 and source device 112A via the short-range wireless network. Example P2P connection established via the short-range wireless network may include a Bluetooth HID connection. In the P2P connection, sink device 102 and source device 112A may be connected and share data without going through any central host. Further, sink device 102 and source device 112A that are connected through the "P2P connection" may be referred to as "peers", where each of sink device 102 and source device 112A can ad as a client and a host. Example client and host functionalities of sink device 102 and source device 112A may be explained in detail in FIGS. 4A and 4B.

During operation, control unit 110 may control, via P2P connection 116A established through the short-range wireless network, media content associated with source device 112A based on a first HID command received at sink device 102. The "HID command" may refer to a user interface (UI)-input command provided by a user on sink device 102 to control respective one of source devices 112A and 112B. In one example, control unit 110 may transmit the first HID command to source device 112A via the short-range wireless network. Further, control unit 110 may receive the media content that reflects the first HID command from source device 112A via the wireless network (i.e., wireless connection 114A). Then, display unit 104 may display/output the media content received from source device 112A.

To switch the P2P connection from source device 112A to source device 112B, the user may select the second display screen. In this case, communication interface unit 108 may receive a second input indicating a selection of the second display screen. Further, communication interface unit 108 may interpret the second input as a control command to disconnect P2P connection 116A between sink device 102 and source device 112A. Upon disconnecting P2P connection 116A, communication interface unit 108 may dynamically establish a P2P connection 116B between sink device 102 and source device 112B via the short-range wireless network. Furthermore, control unit 110 may control the media content of source device 112B via the short-range wireless network based on a second HID command received at sink device 102.

In one example, the components of sink device 102 may be implemented in hardware, machine-readable instructions or a combination thereof. In one example, display unit 104, mirroring unit 106, communication interface unit 108, and control unit 110 may be implemented as engines or modules comprising any combination of hardware and programming to implement the functionalities described herein. Even though FIG. 1 describes about sink device 102, the functionality of the components of sink device 102 may be implemented in other electronic devices such as personal computers (PCs), server computers, tablet computers, mobile devices and the like.

Sink device 102 may include computer-readable storage medium comprising (e.g., encoded with) instructions executable by a processor to implement functionalities described herein in relation to FIG. 1. In some examples, the functionalities described herein, in relation to instructions to Implement functions of the components of sink device 102 and any additional instructions described herein in relation to the storage medium, may be implemented as engines or modules comprising any combination of hardware and programming to implement the functionalities of the modules or engines described herein. The functions of components of sink device 102 may also be implemented by a respective processor. In examples described herein, the processor may include, for example, one processor or multiple processors included in a single device or distributed across multiple devices.

Figure 2A:
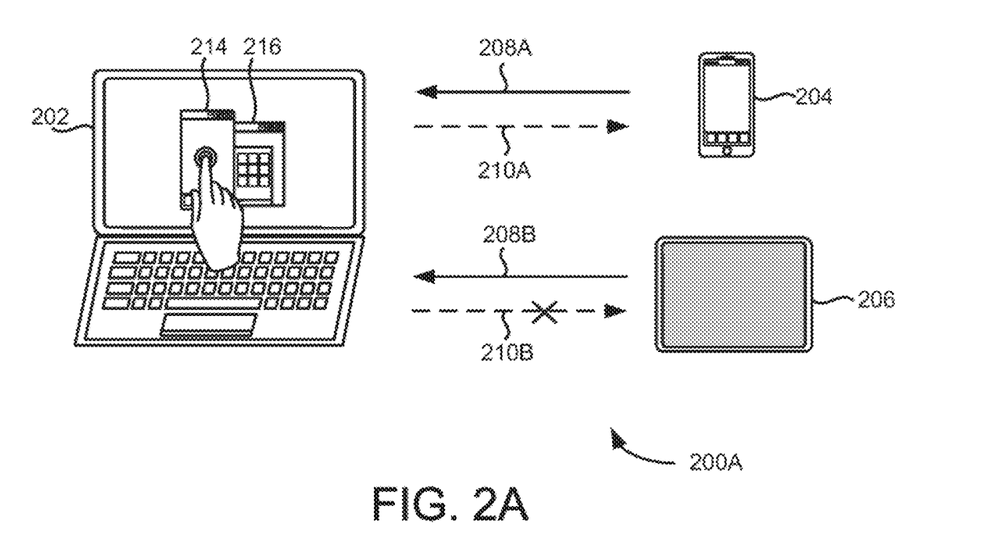
FIGS. 2A-2D illustrate establishing a Bluetooth human interface device (HID) connection between the sink device and a respective source device, according to examples.
Figure 2B:
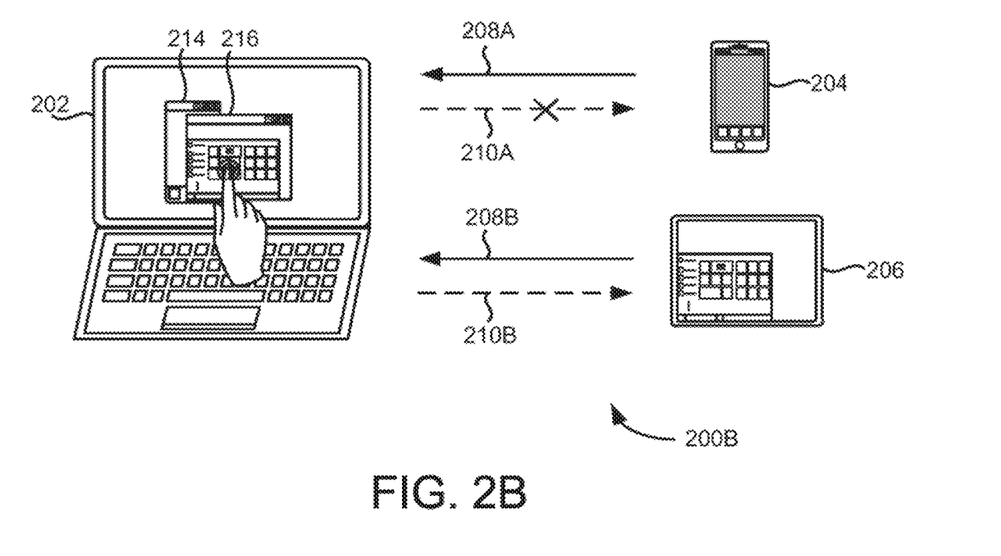

FIGS. 2A and 2B are example schematics 200A and 200B illustrating establishing a Bluetooth HID connection (e.g., P2P connection) between a sink device 202 (e.g., such as sink device 102 of FIG. 1) and a source device 204 or 206 (e.g., such as source devices 112A and 112B of FIG. 1). Example sink device 202 and source devices 204 and 206 may have a Wi-Fi functionality for establishing wireless connections (e.g., Wi-Fi connections 208A and 208B) and a Bluetooth HID functionality for establishing a Bluetooth HID connection (e.g., 210A or 210B). In one example, sink device 202 may be paired with the source devices 204 and 206 via the Bluetooth. Through Wi-Fi connections 208A and 208B, a first display screen 214 of source device 204 and a second display screen 216 of source device 206 may be mirrored on a display (e.g., display unit 104 of FIG. 1) of sink device 202.

Particularly, FIGS. 2A and 2B illustrate establishing the Bluetooth HID connection based on an input indicating a selection of the display screen received through the display of sink device 202. As shown in 200A of FIG. 2A, when the user intends to access media content of source device 204 from sink device 202, the user may provide a touch input indicating a selection of first display screen 214 on sink device 202. The touch input may be interpreted as a control command to dynamically establish Bluetooth HID connection 210A from sink device 202 to source device 204. Upon establishing Bluetooth HID connection 210A, a HID command may be provided at sink device 202 to control source device 204. Sink device 202 may transmit the HID command to source device 204 via Bluetooth HID connection 210A. Further, sink device 202 may receive the media content that reflects the HID command from source device 204 via Wi-Fi connection 208A, and output/display the media content received from source device 204.

For example, consider the HID command may be a selection of an email menu icon displayed on first play screen 214. Upon receiving the HID command from sink device 202, source device 204 may launch an email application and share an associated media content (e.g., inbox mails) to sink device 202 for output at the display. Similarly, HID commands may include media controls, such as play, pause, fast forward, rewind, and the like, associated with media players to control video/audio content of source device 204.

As shown in 200B of FIG. 2B, when the user intends to access media content of source device 206 from sink device 202, the user may provide a touch input indicating a selection of second display screen 216. Upon receiving the touch input indicating the selection of second display screen 216, second display screen 216 may be rendered on a foreground window of sink device 202 (e.g., as shown in FIG. 2B). The touch input may be interpreted as a control command to disconnect Bluetooth HID connection 210A and dynamically establish Bluetooth HID connection 210B from sink device 202 to source device 206. Upon establishing Bluetooth HID connection 210B, a HID command may be provided at sink device 202 to control media content of source device 206.

Figure 2C:
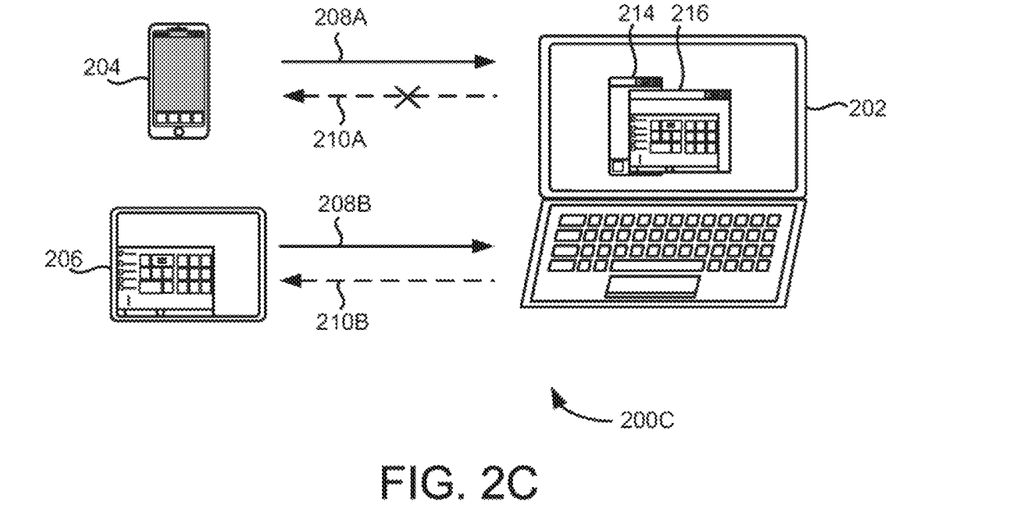
Figure 2D:
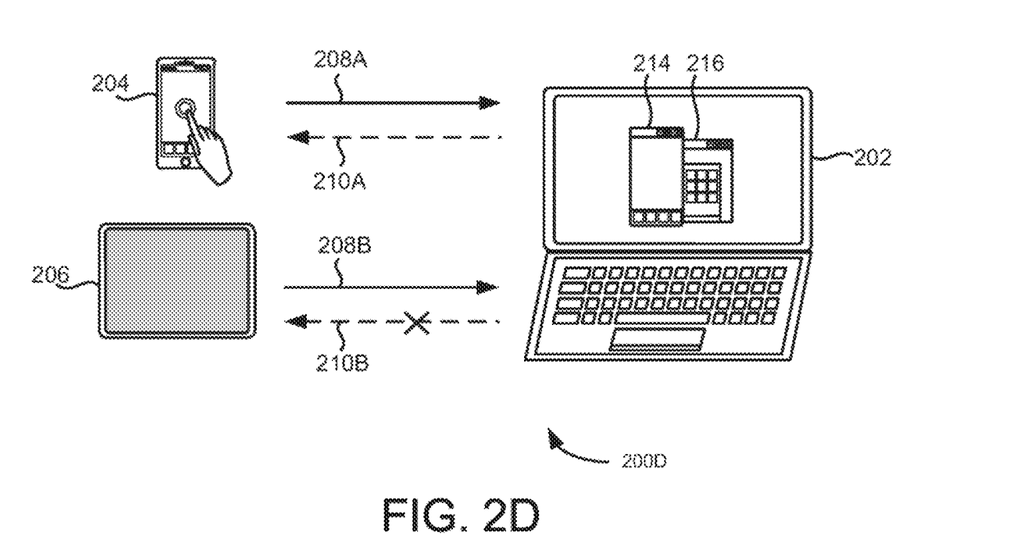

FIGS. 2C and 2D are example schematics 200C and 200D illustrating establishing a Bluetooth HID connection (e.g., 210A or 210B) between sink device 202 and source device 204 or 206. Particularly, FIGS. 2C and 2D illustrate establishing a Bluetooth HID connection based on the input indicating the selection of the display screen received through a display unit of source devices. As shown in 200C of FIG. 2C, source device 206 may maintain Bluetooth HID connection 210B with sink device 202 as described in FIG. 2B. In the example shown in 200D of FIG. 2D, when the user intends to connect source device 204 to sink device 202, a touch input may be provided at source device 204. In one example, the user may provide a touch input on a display of source device 204. Then, an application residing in source device 204 may establish Bluetooth HID connection 210A between source device 204 and sink device 202.

Figure 3:
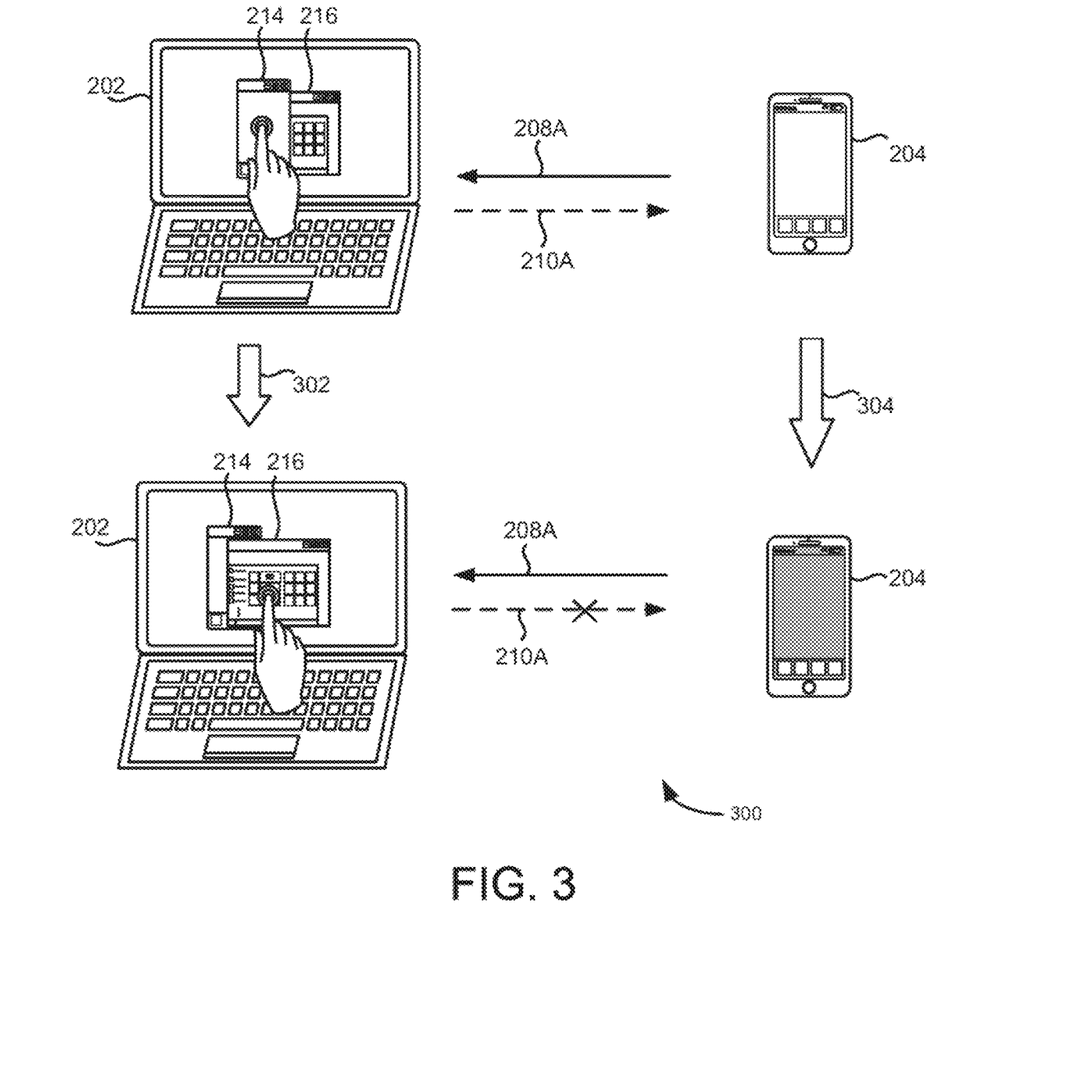
FIG. 3 is an example schematic illustrating placing a source device in a power saving mode upon disconnecting the Bluetooth HID connection between the sink device and the source device.

FIG. 3 is an example schematic 300 illustrating placing source device 204 in a power saving mode upon disconnecting Bluetooth HID connection 210A between sink device 202 and source device 204. In normal operating mode, source device 204 may be connected to sink device 202 through Bluetooth HID connection 210A. As shown in 300 of FIG. 3, upon selection of second display screen 216 (e.g., as shown by arrow 302), Bluetooth HID connection 210A between source device 204 and sink device 202 may be disconnected. Further, the application residing in source device 204 may be instructed to turn-off (e.g., darken) the display screen of source device 204 (e.g., as shown by arrow 304) to reduce power consumption of source device 204.

Figure 4A:
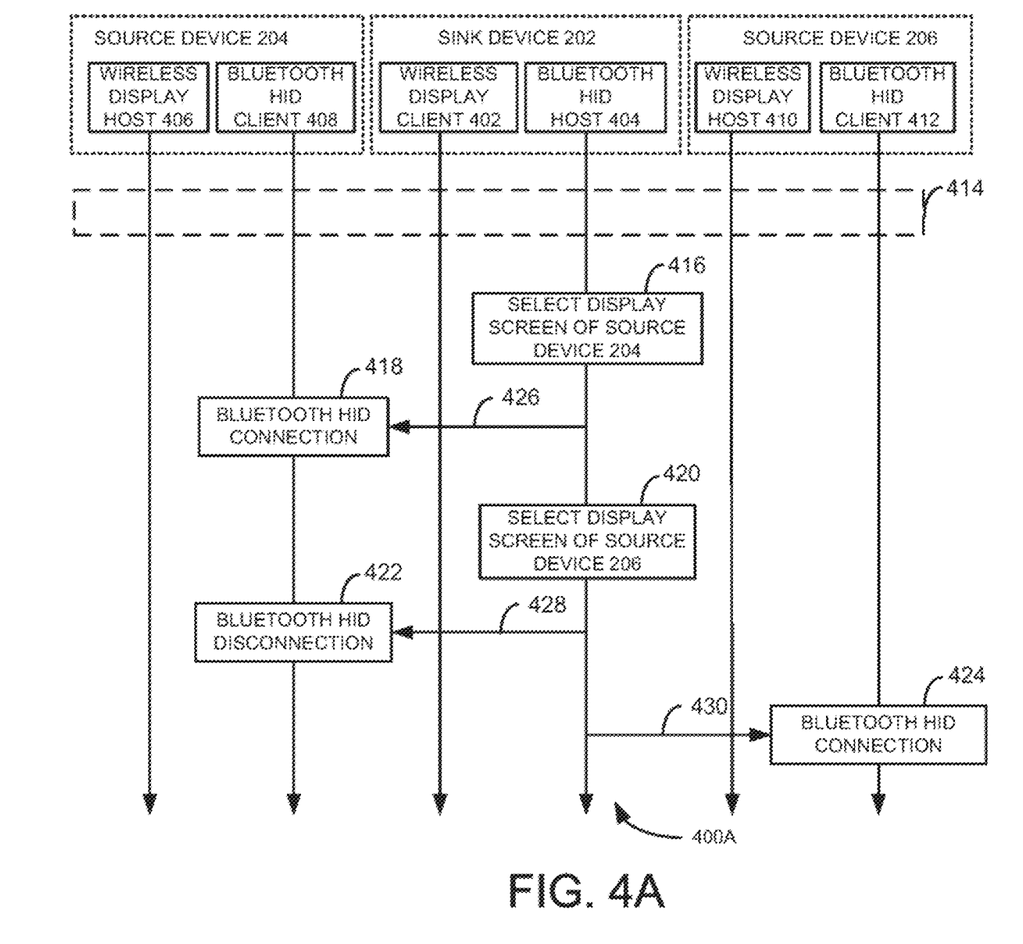
FIG. 4A is an example timeline diagram depicting a sequence of operations between the sink device and respective source devices for establishing the Bluetooth HID connection.

Referring to FIG. 4A, which is a example timeline diagram 400A depicting a sequence of operations between sink device 202 and a respective source device (e.g., 204 or 206) for establishing a Bluetooth HID connection. Example sink device 202 may include a wireless display client 402 and a Bluetooth HID host 404. Example source devices 204 and 206 may include wireless display hosts 406 and 410 and Bluetooth HID clients 408 and 412, respectively. Wireless display client 402 may enable sink device 202 to establish wireless connections with source devices 204 and 206 and receive the media content from source devices 204 and 206 through wireless display hosts 406 and 410, respectively.

Further, Bluetooth HID host 404 may enable sink device 202 to establish Bluetooth HID connections with source devices 204 and 206 and transmit HID commands to source devices 204 and 206 through Bluetooth HID clients 408 and 412, respectively.

At 414, a wireless display connection and/or a Bluetooth HID pairing may be established between sink device 202 and source devices 204 and 206. As shown in FIG. 4A, wireless display client 402 of sink device 202 may receive the media content (i.e., a display screen of source device 204 and a display screen of source device 206) from wireless display hosts 406 and 410 of source devices 204 and 206, respectively.

At 416, the display screen of source device 204 may be selected at sink device 202. At 418, Bluetooth HID host 404 may establish a Bluetooth HID connection between source device 204 and sink device 202 (e.g., as shown by arrow 426) upon the selection of the display screen of source device 204. At 420, the display screen of source device 206 may be selected. At 422, Bluetooth HID host 404 may disconnect the Bluetooth HID connection between source device 204 and sink device 202 (e.g., as shown by arrow 428) upon the selection of the display screen of source device 206. At 424, Bluetooth HID host 404 may dynamically establish a Bluetooth HID connection between source device 206 and sink device 202 (e.g., as shown by arrow 430). The steps 422 and 424 may be performed simultaneously.

Figure 4B:
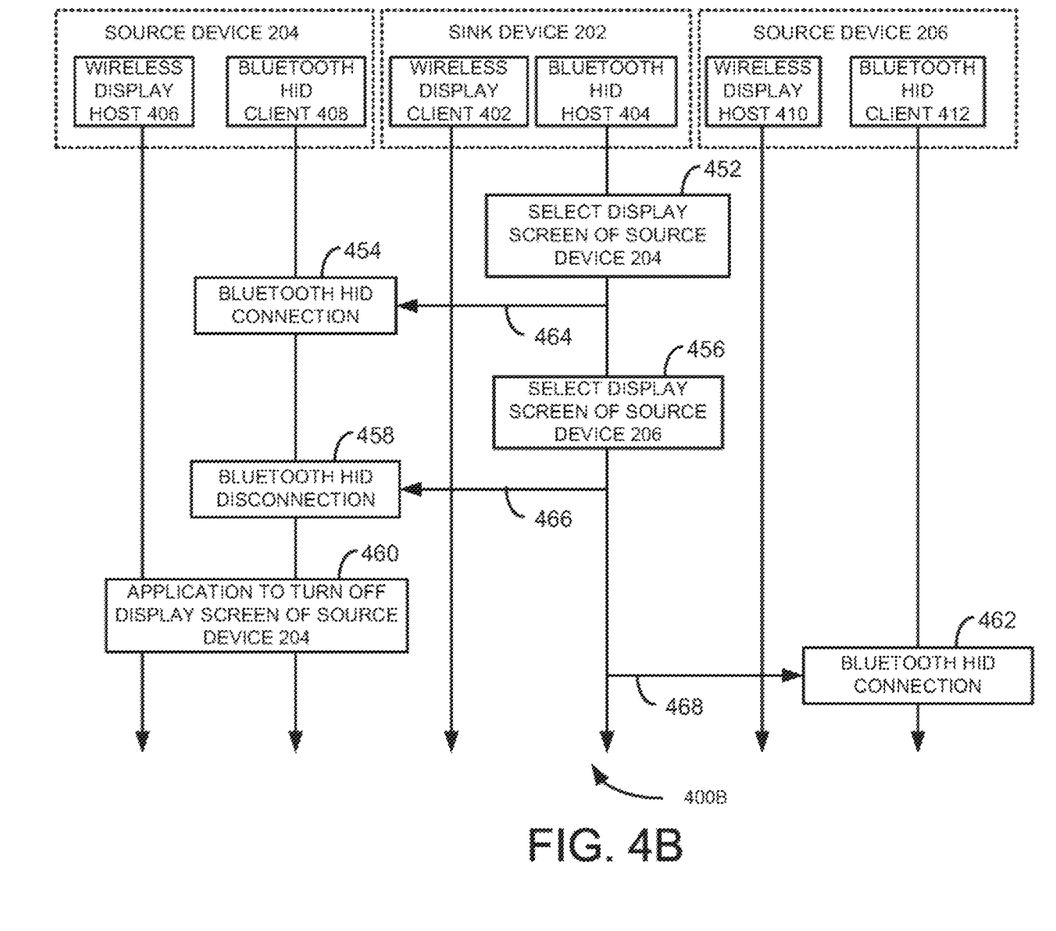
FIG. 4B is another example timeline diagram depicting a sequence of operations between the sink device and respective source devices for reducing power consumption of the source devices.

Referring to FIG. 4B, which is another example timeline diagram 400B depicting a sequence of operations between sink device 202 and a respective source device 204 or 206 for reducing power consumption of source devices. In this case, at 452, the display screen of source device 204 may be selected at sink device 202. At 454, Bluetooth HID host 404 may establish a Bluetooth HID connection between source device 204 and sink device 202 (e.g., as shown by arrow 464) upon selection of the display screen of source device 204. At 456, the display screen of source device 206 may be selected, At 458, Bluetooth HID host 404 may disconnect the Bluetooth HID connection between source device 204 and sink device 202 (e.g., as shown by arrow 466) upon selection of the display screen of source device 206.

At 460, an application residing in source device 204 may turn-off the display screen of source device 204 to enable power saving mode. The term "power saving mode" may refer to a display mode for suppressing electric power consumption by controlling a screen display such as darkening the screen display or turning off at least a part of the screen display. At 462, Bluetooth HID host 404 may dynamically establish a Bluetooth HID connection between source device 206 and sink device 202 (e.g., as shown in arrow 468). For example, the steps 458, 460, and 462 may be performed simultaneously.

Figure 5:
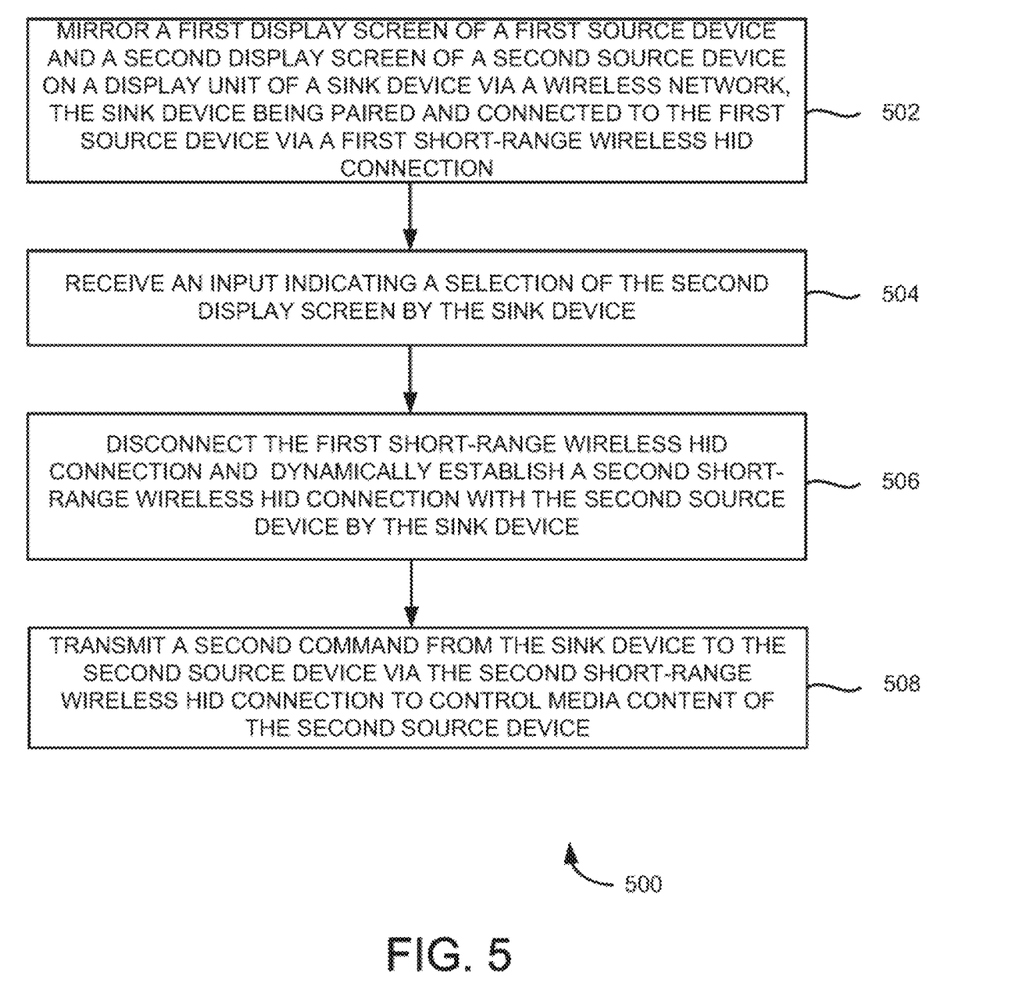
FIG. 5 depicts an example flow chart for controlling media content of source devices from a sink device.

FIG. 5 depicts an example flow chart 500 of a process for controlling media content of the source devices from the sink device. It should be understood that the process depicted in FIG. 5 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate programs, or use a combination of hardware and program to perform the illustrated processes.

At 502, a first display screen of a first source device and a second display screen of a second source device may be mirrored on a display Unit of a sink device via a wireless network. Example wireless network includes a Wi-Fi network. Further, the sink device may be paired and connected to the first source device via a first short-range wireless HID connection to transmit a first command to control media content of the first source device.

At 504, an input indicating a selection of the second display screen may be received by the sink device. In this case, the second source device may be paired with the sink device but not connected to the sink device. In one example, the input indicating the selection of the second display screen may be received through the display unit of the sink device. In another example, the input indicating the selection of the second display screen may be received from an application residing in the second source device.

At 506, the first short-range wireless HID connection between the first source device and the sink device may be disconnected and a second shod-range wireless HID connection between the sink device and the second source device may be dynamically established by the sink device upon receiving the input. In one example, upon connecting the first short-range wireless HID connection between the first source device and the sink device, an application residing in the first source device may be instructed to turn-off the screen of the first source device. In one example, the first short-range wireless HID connection and the second short-range wireless HID connection may be established based on a Bluetooth network, a Bluetooth tow energy network, or a ZigBee network. Further, upon receiving the input indicating the selection of the second display screen, the second display screen of the second source device may be rendered on a foreground window of the display unit. The first display screen of the first source device may be displayed on a background window.

At 508, a second command may be transmitted from the sink device to the second source device via the second short-range wireless HID connection to control media content of the second source device. In one example, the media content associated with the first source device and the media content associated with the second source device may be received by the sink device via the wireless network (e.g. Wi-Fi).

Figure 6:
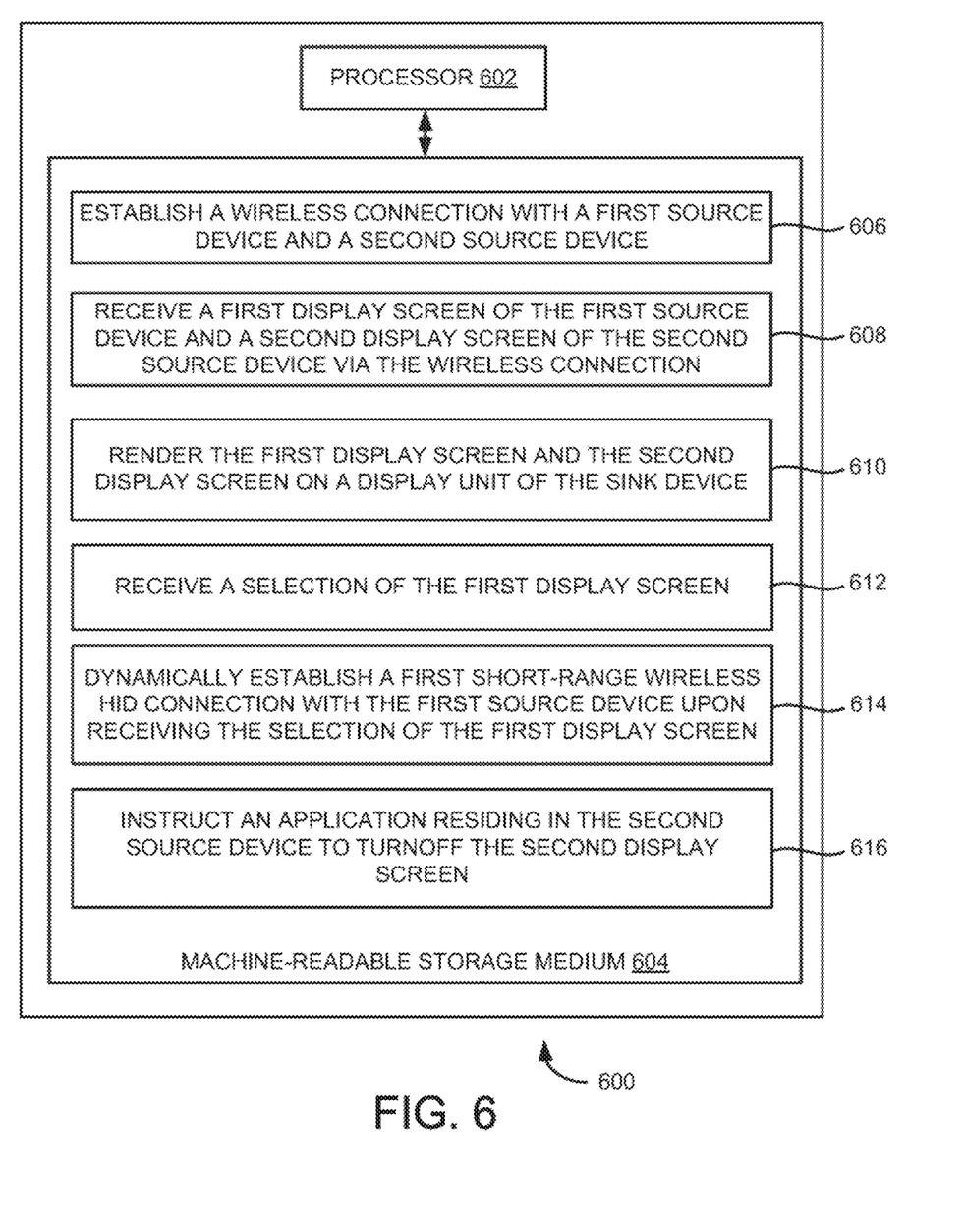
FIG. 6 depicts an example lock ram of sink device to control media content of source devices.

FIG. 6 illustrates a block diagram 600 of an example electronic device (i.e., sink device) to control media content of source devices. Electronic device 600 may include a processor 602 and a machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to electronic device 600.

Machine-readable storage medium 604 may store instructions 606-616. In an example, instructions 606-616 may be executed by processor 602 to control media content of source devices. Instructions 606 may be executed by processor 602 to establish a wireless connection with a first source device and a second source device. In one example, the first source device and the second source device may be paired with the sink device (e.g., via a Bluetooth network). Instructions 608 may be executed by processor 602 to receive a first display screen of the first source device and a second display screen of the second source device via the wireless connection.

Instructions 610 may be executed by processor 602 to render the first display screen and the second display screen on a display unit of the sink device. Instructions 612 may be executed by processor 602 to receive a selection of the first display screen. Instructions 614 may be executed by processor 602 to dynamically establish a first short-range wireless human interface device (HID) connection with the first source device upon receiving the selection of the first display screen. For example, the first short-range wireless HID connection may be a first Bluetooth HID connection between the first source device and the sink device. Instructions 616 may be executed by processor 602 to instruct application residing in the second source device to turn-off the second display screen of the second source device.

In one example, upon establishing the first short-range wireless HID connection, a first command may be transmitted from the sink device to the first source device via the first short-range wireless HID connection. Further, media content that reflects the first command may be received from the first source device via the wireless connection. Furthermore, the media content received from the first source device may be provided as an output on the display unit of the sink device.

Further, a selection of the second display screen may be received. Upon receiving a selection of the second display screen, first short-range wireless HID connection with the first source device may be disconnected and an application residing in the first source device may be instructed to turn-off the first display screen of the first source device. Simultaneously, a second short-range wireless HID connection may be dynamically established with the second source device. For example, the second short-range wireless HID connection may be a second Bluetooth HID connection between the second source device and the sink device. In this case, a second command may be transmitted from the sink device to the second source device via the second short-range wireless HID connection. Further, media content that reflects the second command may be received from the second source device via the wireless connection. Furthermore, the media content received from the second source device may be provided as an output on the display unit of the sink device.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A sink device comprising:
   a display unit;
   a mirroring unit to mirror, at the display unit via a wireless network, a first display screen of a first source device and a second display screen of a second source device;
   a communication interface unit to:
   receive a first input indicating a selection of the first display screen; and
   interpret the first input as a control command to dynamically establish a peer-to-peer connection between the sink device and the first source device via a short-range wireless network; and
   a control unit to control, via the short-range wireless network, media content associated with the first source device based on a first human interface device (HID) command received at the sink device;
   wherein the media content is received via the wireless network, and wherein HID commands are sent via the short-range wireless network.

2. The sink device of claim 1, wherein the communication interface unit is to:
   receive a second input indicating a selection of the second display screen; and
   interpret the second input as a control command to:
   disconnect the peer-to-peer connection established, via the short-range wireless network, between the sink device and the first source device; and
   dynamically establish a peer-to-peer connection between the sink device and the second source device via the short-range wireless network, wherein the control unit is to control, via the short-range wireless network, the media content associated with the second source device based on a second HID command received at the sink device.

3. The sink device of claim 1, wherein the wireless network comprises a Wi-Fi network, and wherein the short-range wireless network comprises a Bluetooth network, a Bluetooth low energy network, or a ZigBee network.

4. The sink device of claim 1, wherein the sink device is paired with the first source device and the second source device via the short-range wireless network, and wherein the sink device, the first source device, and the second source device are Bluetooth enabled HID devices.

5. The sink device of claim 1, wherein the control unit is to:
   transmit the first HID command to the first source device via the short-range wireless network; and
   receive the media content that reflects the first HID command from the first source device via the wireless network, wherein the display unit is to output the media content received from the first source device.

6. The sink device of claim 1, wherein the communication interface unit is to:
   receive, through the display unit, the first input indicating the selection of the first display screen; or
   receive the first input indicating the selection of the fast display screen from the first source device.

7. A method comprising:
   mirroring a first display screen of a first source device and a second display screen of a second source device on a display unit of a sink device via a wireless network, the sink device being paired and connected to the first source device via a first short-range wireless human interface device (HID) connection to transmit a first command to control media content of the first source device;
   receiving an input from a user interface of the sink device indicating a selection of the second display screen by the sink device;
   upon receiving the input, disconnecting the first short-range wireless HID connection and dynamically establishing a second short-range wireless HID connection with the second source device by the sink device; and
   transmitting a second command from the sink device to the second source device via the second short-range wireless HID connection to control media content of the second source device.

8. The method of claim 7, further comprising:
   instructing an application residing in the first source device to turn-off the first display screen upon disconnecting the first short-range wireless HID connection between the first source device and the sink device.

9. The method of claim 7, wherein the media content associated with the first source device and the media content associated with the second source device are received by the sink device via the wireless network, wherein the wireless network is a Wi-Fi network, and wherein the first short-range wireless HID connection and the second short-range wireless HID connection are established based on a Bluetooth network, a Bluetooth low energy network, or a ZigBee network.

10. The method of claim 7, wherein receiving the input indicating the selection of the second display screen comprises:
    receiving the input, through the display unit indicating the selection of the second display screen; or
    receiving the input, from an application residing in the second source device, indicating the selection of the second display screen.

11. The method of claim 7, wherein upon receiving the input indicating the selection of the second display screen, the second display screen is rendered on a foreground window of the display unit.

12. A non-transitory computer-readable storage medium comprising instructions that, when executed by a processor of a sink device, cause the processor to:
    establish a wireless connection with a first source device and a second source device, wherein the first source device and the second source device are paired with the sink device;
    receive a first display screen of the first source device and a second display screen of the second source device via the wireless connection;
    render the first display screen and the second display screen on a display unit of the sink device;

receive, from a user interface of the sink device, a selection of the first display screen;

dynamically establish a first short-range wireless human interface device (HID) connection with the first source device upon receiving the selection of the first display screen; and instruct an application residing in the second source device to turn-off the second display screen.

13. The non-transitory computer-readable storage medium of claim 12, comprising instructions to:

transmit a first command from the sink device to the first source device via the first short-range wireless HID connection, wherein the first short-range wireless HID connection comprises a first Bluetooth HID connection;

receive media content that reflects the first command from the first source device via the wireless connection; and output the media content received from the first source device on the display unit.

14. The non-transitory computer-readable storage medium of claim 12, comprising instructions to:

receive a selection of the second display screen;

disconnect the first short-range wireless HID connection with the first source device and instruct an application residing in the first source device to turn-off the first display screen upon receiving the selection of the second display screen; and dynamically establish a second short-range wireless HID connection with the second source device.

15. The non-transitory computer-readable storage medium of claim 14, comprising instructions to:

transmit a second command from the sink device to the second source device via the second short-range wireless HID connection, wherein the second short-range wireless HID connection comprises a second Bluetooth HID connection;

receive media content that reflects the second command from the second source device via the wireless connection; and output the media content received from the second source device on the display unit.

* * * * *